United States Patent
Kwon et al.

(10) Patent No.: US 7,720,503 B2
(45) Date of Patent: May 18, 2010

(54) METHOD AND SYSTEM FOR CONTROLLING POWER IN A COMMUNICATION SYSTEM

(75) Inventors: Ho-Joong Kwon, Seoul (KR); Byeong-Gi Lee, Seoul (KR); Han-Byul Seo, Seoul (KR); Won-Hyoung Park, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 506 days.

(21) Appl. No.: 11/811,538

(22) Filed: Jun. 11, 2007

(65) Prior Publication Data
US 2008/0026782 A1    Jan. 31, 2008

(30) Foreign Application Priority Data
Jun. 9, 2006    (KR) ............... 10-2006-0052230

(51) Int. Cl.
*H04B 7/00* (2006.01)

(52) U.S. Cl. ............... 455/522; 455/115.1; 455/115.2; 455/115.3; 455/69; 455/67.11

(58) Field of Classification Search ............... 455/522, 455/115.1, 115.2, 115.3, 69, 67.11
See application file for complete search history.

(56) References Cited

U.S. PATENT DOCUMENTS
2004/0110477 A1 * 6/2004 Nishimura et al. ....... 455/127.1

* cited by examiner

*Primary Examiner*—Yuwen Pan
*Assistant Examiner*—Adel Youssef
(74) *Attorney, Agent, or Firm*—The Farrell Law Firm, LLP

(57) ABSTRACT

A method for controlling power in a communication system. In the power control method, a transmitter receives feedback information from receivers located in its own cell; determines data rates of the receivers according to the received feedback information, calculates a load of the cell by calculating an amount of data to be transmitted to the receivers; and calculates transmission power of the transmitter by comparing the load of the cell with a threshold.

22 Claims, 2 Drawing Sheets

METHOD AND SYSTEM FOR CONTROLLING POWER IN A COMMUNICATION SYSTEM

PRIORITY

This application claims priority under 35 U.S.C. §119(a) to a Korean Patent Application filed in the Korean Intellectual Property Office on Jun. 9, 2006 and assigned Serial No. 2006-52230, the disclosure of which is incorporated herein by reference.

BACKGROUND OF THE INVENTION

1. Field of the Invention

The present invention relates generally to a communication system, and in particular, to a power control method and system for minimizing interference between neighbor cells in a communication system with a multi-cell configuration.

2. Description of the Related Art

Intensive research on the next generation communication system is being conducted to provide users with high-speed services having various Quality of Service (QoS) classes. The communication system may experience interference between multiple cells, especially between neighbor cells, because the multiple cells constituting the communication system share the limited resources, for example, frequency resources, code resources, time slot resources, etc. Due to the interference between neighbor cells, Mobile Stations (MSs) located in a particular cell, especially the MSs located in the boundary area of the cell, may suffer from a considerable decrease in reception performance of the signals received from a Base Station (BS) in charge of the cell ("serving BS").

Also, the serving BS in charge of a particular cell may suffer from a considerable decrease in reception performance of the signals received from MSs located in the cell due to the interference between neighbor cells. That is, in the communication system with a multi-cell configuration, a BS in charge of its own cell and MSs located in the cell may receive interference from neighbor cells, for example, from BSs in charge of the neighbor cells ("neighbor BSs"), and from MSs located in the neighbor cells.

In the communication system with a multi-cell configuration, due to the occurrence of interference between neighbor cells, the communication system may suffer from a decrease in signal transmission/reception performance, and also may not guarantee the required QoS for users. Therefore, there is a need for a power control scheme for minimizing interference between neighbor cells in the communication system with a multi-cell configuration. There is also a need for a power control scheme for increasing performance and efficiency of the communication system with a multi-cell configuration.

SUMMARY OF THE INVENTION

An aspect of the present invention is to address at least the problems and/or disadvantages above and to provide at least the advantages described below. Accordingly, an aspect of the present invention is to provide a method and system for controlling power in a communication system.

Another aspect of the present invention is to provide a method and system for controlling power in a communication system with a multi-cell configuration.

Another aspect of the present invention is to provide a power control method and system for minimizing interference between neighbor cells in a communication system with a multi-cell configuration.

According to one aspect of the present invention, there is provided a method for controlling power in a communication system. In the power control method, a transmitter receives feedback information from receivers located in its own cell; determines data rates of the receivers according to the received feedback information, calculates a load of the cell by calculating an amount of data to be transmitted to the receivers; and calculates transmission power of the transmitter by comparing the load of the cell with a threshold.

According to another aspect of the present invention, there is provided a system for controlling power in a communication system. The power control system includes a transmitter for receiving feedback information from receivers located in its own cell, determining data rates of the receivers according to the received feedback information, calculating a load of the cell by calculating an amount of data to be transmitted to the receivers, and calculating transmission power of the transmitter by comparing the load of the cell with a threshold.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
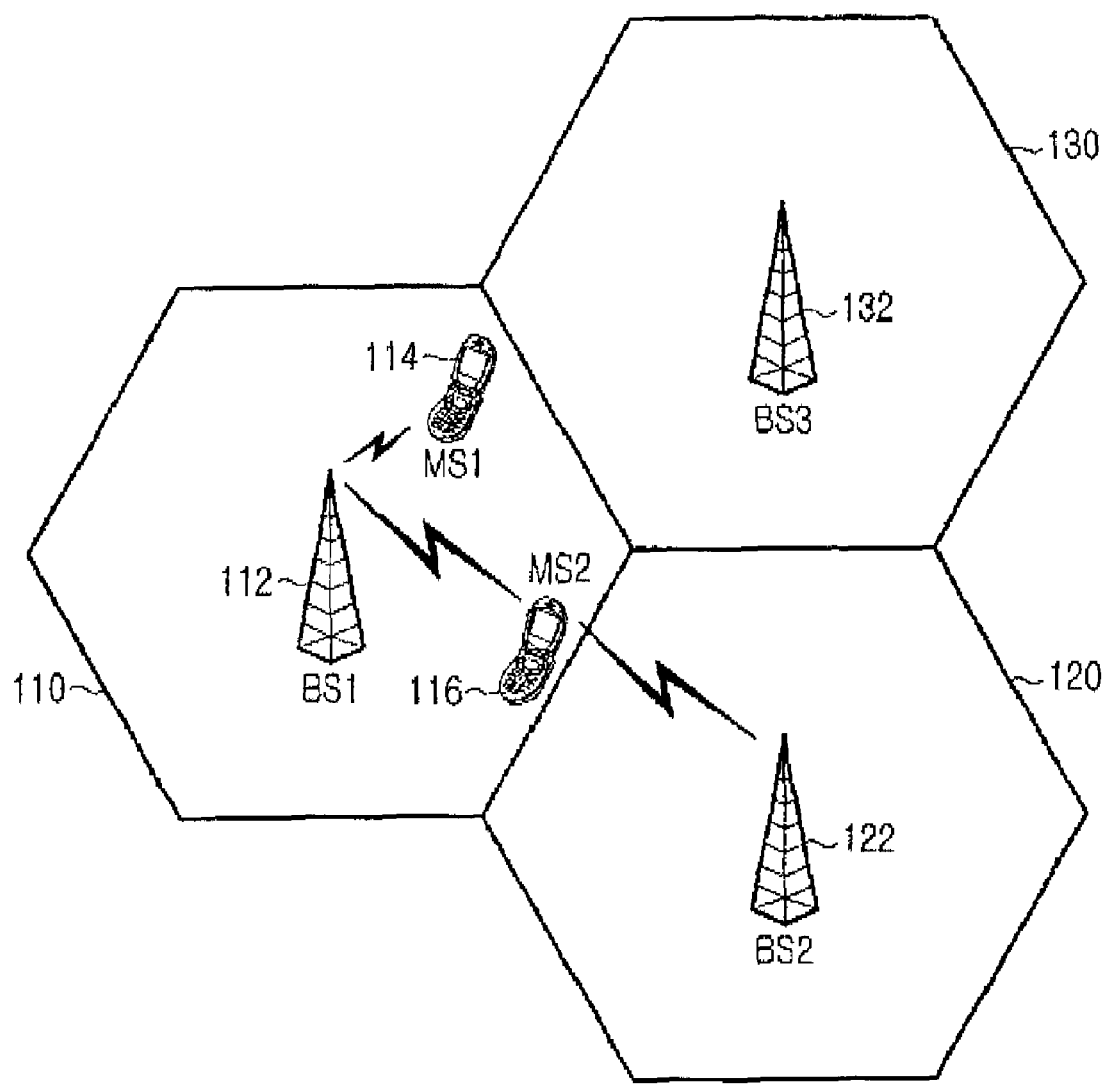
FIG. 1 is a diagram schematically illustrating a configuration of a communication system according to the present invention.

Preferred embodiments of the present invention will now be described in detail with reference to the annexed drawings. In the following description, a detailed description of known functions and configurations incorporated herein has been omitted for clarity and conciseness.

The present invention provides a method and system for controlling power in a communication system, for example, an Institute of Electrical and Electronics Engineers (IEEE) 802.16 communication system, which is a Broadband Wireless Access (BWA) communication system. Although embodiments of the present invention will be described herein with reference to a communication system employing Orthogonal Frequency Division Multiplexing (OFDM)/Orthogonal Frequency Division Multiple Access (OFDMA) as the IEEE 802.16 communication system, the power control method and system provided by the present invention can also be applied to other communication systems.

Also, the present invention provides a power control method and system for data transmission/reception between a transmitter, for example, a Base Station (BS) in charge of a particular cell, and a receiver for receiving data from the transmitter, for example, a Mobile Station (MS) located in the cell, for receiving a communication service from the BS, in a communication system with a multi-cell configuration. An embodiment of the present invention, described herein, provides a power control method and system for a downlink in which a BS in charge of a particular cell transmits data to an MS located in the cell, and for an uplink in which an MS receiving a communication service from a BS in charge of the cell receives data from the BS in a communication system with a multi-cell configuration employing OFDM/OFDMA. In particular, although an embodiment of the present invention will be described herein for the downlink in which a transmitter, i.e. a BS, transmits data to receivers, i.e. MSs, the power control method and system provided by the present invention can also be applied to all other cases where the communication system transmits/receives data.

In addition, the present invention provides a power control method and system for minimizing interference between neighbor cells in a communication system with a multi-cell configuration. An embodiment of the present invention, described herein, provides a power control method and system for minimizing interference to a BS and an MS, between neighbor cells in a communication system with a multi-cell configuration employing OFDM/OFDMA in which data transmission/reception is performed between the BS in charge of a particular cell and the MS located in the cell. Further, an embodiment of the present invention provides a power control method and system for guaranteeing various Quality of Service (QoS) classes by improving data reception performance of an MS that experiences greater interference between neighbor cells, as it is located in the boundary area of a particular cell, in other words, as it is located farther from a BS in charge of the cell, as compared with an MS located closer to the BS, i.e. located in the center area of the cell.

That is, the present invention provides a power control method and system for a communication system in which a transmitter transmits data to a receiver according to feedback information provided from the receiver and the amount of scheduled transmission data to the receiver. Herein, the feedback information that the transmitter receives from the receiver is measurement information, i.e. Channel Quality Information (CQI), obtained by measuring strength of a signal received when the receiver receives data from the transmitter, and strength of interference signals that cause interference to the receiver when other transmitters transmit data, and the feedback information may include, for example, Signal to Interference and Noise Ratio (SINR) information or Carrier to Interference and Noise Ratio (CINR) information. That is, the transmitter receives SINR or CINR from the receiver as the feedback information. For convenience, it will be assumed herein that the transmitter receives the SINR information.

FIG. 1 is a diagram schematically illustrating a configuration of a communication system according to the present invention.

Referring to FIG. 1, the communication system has a multi-cell configuration, i.e. has a cell #1 110, a cell #2 120, and a cell #3 130, and includes transmitters, i.e. BS1 112, BS2 122 and BS3 132, for managing the cells 110, 120 and 130, respectively, and providing a communication service, and receivers, i.e. MS1 114 and MS2 116, which are located in the cell #1 110 and receive communication service from the BS1 112. Herein, the MSs, i.e. the MS1 114 and the MS2 116, have both mobility and fixability, and for convenience, it will be assumed that the MS1 114 is located closer to the BS1 112, i.e. located in the center area of the cell #1 110, and the MS2 116 is located farther from the BS1 112, i.e. located in the boundary area of the cell #1 110. In addition, signal exchange between the BSs 112, 122 and 132, and the MSs 114 and 116 located in the cells 110,120 and 130 is assumed to be performed using OFDM/OFDMA.

The MS1 114, because it is located in the center area of the cell #1 110, experiences less path attenuation (or pass loss), compared with other MSs, for example, the MS2 116, and the MS2 116, because it is located in the boundary area of the cell #1 110, experiences greater path attenuation, compared with other MSs, for example, the MS1 114. If the MSs 114 and 116 experience the path attenuation in this way while receiving data from the BS1 112, they may measure the path attenuation. More specifically, the receivers, i.e. the MSs 114 and 116, of the cell #1 110 measure strength of a signal received from its associated transmitter, i.e. the BS1 112, and strength of signals, i.e. interference signals, received from the other transmitters, i.e. the BS2 122 and the BS3 132, other than the BS1 112, and then transmit the measurement information to the BS1 112. Herein, the measurement information, which is feedback information transmitted from the BS1 112, is, for example, information on measured SINR or CINR, and the SINR or CINR is calculated by measuring pilots on signals received from the transmitters. The measurement of the SINR or CINR is not directly related to the present invention, so a detailed description thereof will be omitted herein.

When the transmitter, i.e. the BS1 112, in charge of a particular cell, for example, the cell #1 110, receives feedback information, for example, SINR information, transmitted from the receivers, i.e. the MS1 114 and the MS2 116, that receive a communication service from the transmitter itself, the transmitter calculates power for transmitting data to the receivers. Transmission power of the transmitter is determined using a utility function shown in Equation (1). That is, the transmitter calculates transmission power for maximizing the utility function shown in Equation (1), and then transmits data to receivers using the calculated transmission power, thereby providing a communication service to the receivers.

$$\text{Utility} = \sum_{k=1}^{K} \mu_k R_k(P_1, \ldots, P_M) - p \sum_{m=1}^{M} P_m \qquad (1)$$

In Equation (1), K denotes the number of receivers receiving a communication service from the transmitter, M denotes the number of subchannels that the transmitter has allocated to provide a communication service to the K receivers, and $\mu_k$ denotes a weighting factor of an arbitrary receiver k and is determined according to a subchannel allocation algorithm or QoS provided to the receivers. Calculation of $\mu_k$ is not directly related to the present invention, so a detailed description thereof will be omitted herein. In addition, $P_m$ denotes power allocated to an arbitrary subchannel m, $R_k$ denotes a data rate of an arbitrary receiver k, and p denotes a price per transmission power and means a transmission power weighting factor. The price will be described in detail hereinbelow.

Further, in Equation (1), $R_k(P_1, \ldots, P_M)$ means a data rate of each receiver, for example, an arbitrary receiver k when transmission power vectors to the receivers are $P_1, \ldots, P_M$, respectively, i.e. when transmission power densities to the receivers are $P_1, \ldots, P_M$, respectively. Herein, the transmission power vectors, i.e. transmission power densities $P_1, \ldots, P_M$ to the receivers mean power of subchannels allocated to the receivers, i.e. transmission power of M subchannels. The data rate $R_k$, as described above, is calculated according to feedback information received from the receivers, for example, SINRs received from the receivers, and the transmitter finds channel gain information of corresponding receivers, and interference and noise information of the receivers depending on the SINR information, or feedback information, received from the receivers.

When the transmitter calculates the data rate $R_k$ according to the SINR information transmitted from the receivers in this manner, the $$\sum_{k=1}^{K} \mu_k R_k(P_1, \ldots, P_M)$$

in Equation (1) means the total amount of data to be transmitted to the K receivers. In addition, when the transmitter determines power to be allocated to each of the M subchannels and a price p per transmission power, i.e. transmission power weighting factor, $$p \sum_{m=1}^{M} P_m$$

in Equation (1) means the power to be allocated to the M subchannels. A description will now be made of an operation in which the transmitter calculates a price p per transmission power, or a transmission power weighting factor.

The transmitter calculates the total amount of data that it will transmit to MSs located in its own cell, i.e. calculates a load of the cell, and then calculates the price p according to the calculated load. The transmitter calculates a load of the cell by summing up average queue sizes of the receivers for a predetermined period. Alternatively, the transmitter calculates a load of the cell by periodically generating virtual tokens for individual receivers, loading the tokens into a token queue, and removing the tokens loaded into the token queue when transmitting data to the receivers. The transmitter can calculate a load of the cell not only according to the amount of data to be transmitted to the receivers, but also to QoS of the receivers. An operation of calculating a load of the cell is not directly related to the present invention, so a detailed description thereof will be omitted herein.

The transmitter controls transmission power according to the load calculated in this manner. That is, when the calculated load is high, the transmitter decreases the price to increase a value of transmission power calculated by the utility function shown in Equation (1), thereby improving data reception performance of the receivers. On the contrary, when the calculated load is low, the transmitter increases the price to decrease a value of transmission power calculated by the utility function shown in Equation (1) thereby preventing the waste of power, and to decrease the number of subchannels in an active state thereby preventing waste of resources. In addition, the transmitter controls transmission power according to feedback information received from the receivers and information on the data to be transmitted to the receivers, thereby minimizing interference to neighbor cells.

More specifically, when a user or a system sets initial transmission power to $P_0$ according to the communication system and communication environment, the transmitter, because the transmission power and the price have an inverse proportional relationship as described above, performs an update for a predetermined period, so the price after the predetermined period can be expressed as Equation (2).

$$p(t+1) = p(t) P_{avg}(t) / P_0 \quad (2)$$

In Equation (2), p(t) denotes a price in a previous period, and an initial price p(0) is set by the user or the system according to the communication system and communication environment. In addition, $P_{avg}(t)$ denotes average transmission power used for data transmission for the previous period, and p(t+1) denotes a price after a predetermined period.

After determining the price by performing an update for a predetermined period in this manner, the transmitter calculates a price according to a load of its own cell. More specifically, the transmitter compares the load of the cell with a first threshold $TH_U$ and a second threshold $TH_L$, and then calculates the price according to the comparison result as shown in Equation (3) or Equation (4). Herein, the first threshold $TH_U$ means an upper threshold approaching the maximum data buffer size, and the second threshold $TH_L$ means a lower threshold approaching the minimum data buffer size, i.e. 0. When the load of the cell is greater than the first threshold $TH_U$, the price can be expressed as shown in Equation (3), and when the load of the cell is less than the second threshold $TH_L$, the price can be expressed as shown in Equation (4).

$$p(t+1) = p(t) - \frac{\delta_U(W - TH_U)}{TH_U} \quad (3)$$

$$p(t+1) = p(t) + \frac{\delta_L(TH_L - W)}{TH_L} \quad (4)$$

In Equation (3) and Equation (4), W denotes a load of the cell, and $\delta_U$ and $\delta_L$ denote a step size of a step function, and mean a variation in the price. Herein, the $\delta_U$ and $\delta_L$ are set by the user or the system according to the communication system and communication environment.

After calculating the price in this manner, the transmitter calculates transmission power to be used for data transmission to receivers in the cell using the utility function shown in Equation (1). That is, in Equation (1), the transmitter, as described above, calculates data rates of the receivers depending on feedback information received from the receivers located in its own cell, and then calculates a load of the cell depending on the calculated data rates and the amount of data to be transmitted to each of the receivers, i.e. calculates the total amount of data to be transmitted to the receivers. Thereafter, the transmitter compares the calculated load of the cell with a first threshold and a second threshold, and then calculates a price according to the comparison result using Equation (3) and Equation (4).

That is, when the load of the cell is high, i.e. when the load of the cell is greater than the first threshold, the transmitter decreases the price below that in the previous period using Equation (3) so as to decrease a value of the transmission power calculated by the utility function shown in Equation (1). However, when the load of the cell is low, i.e. when the load of the cell is less than the second threshold, the transmitter increases the price above that in the previous period using Equation (4) so as to increase a value of the transmission power calculated by the utility function shown in Equation (1). As a result, when the load of the cell is high, i.e. when the amount of data to be transmitted to the receivers is great, the transmitter decreases the price to increase transmission power, thereby improving data reception performance of the receivers and thus improving system performance. However, when the load of the cell is low, i.e. when the amount of data to be transmitted to the receivers is less, the transmitter increases the price to decrease transmission power thereby preventing the waste of transmission power, and to decrease the number of subchannels in an active state thereby preventing waste of resources. In addition, the transmitter, as described above, controls transmission power according to feedback information received from the receivers and information on the data to be transmitted to the receivers, thereby minimizing interference to neighbor cells.

Figure 2:
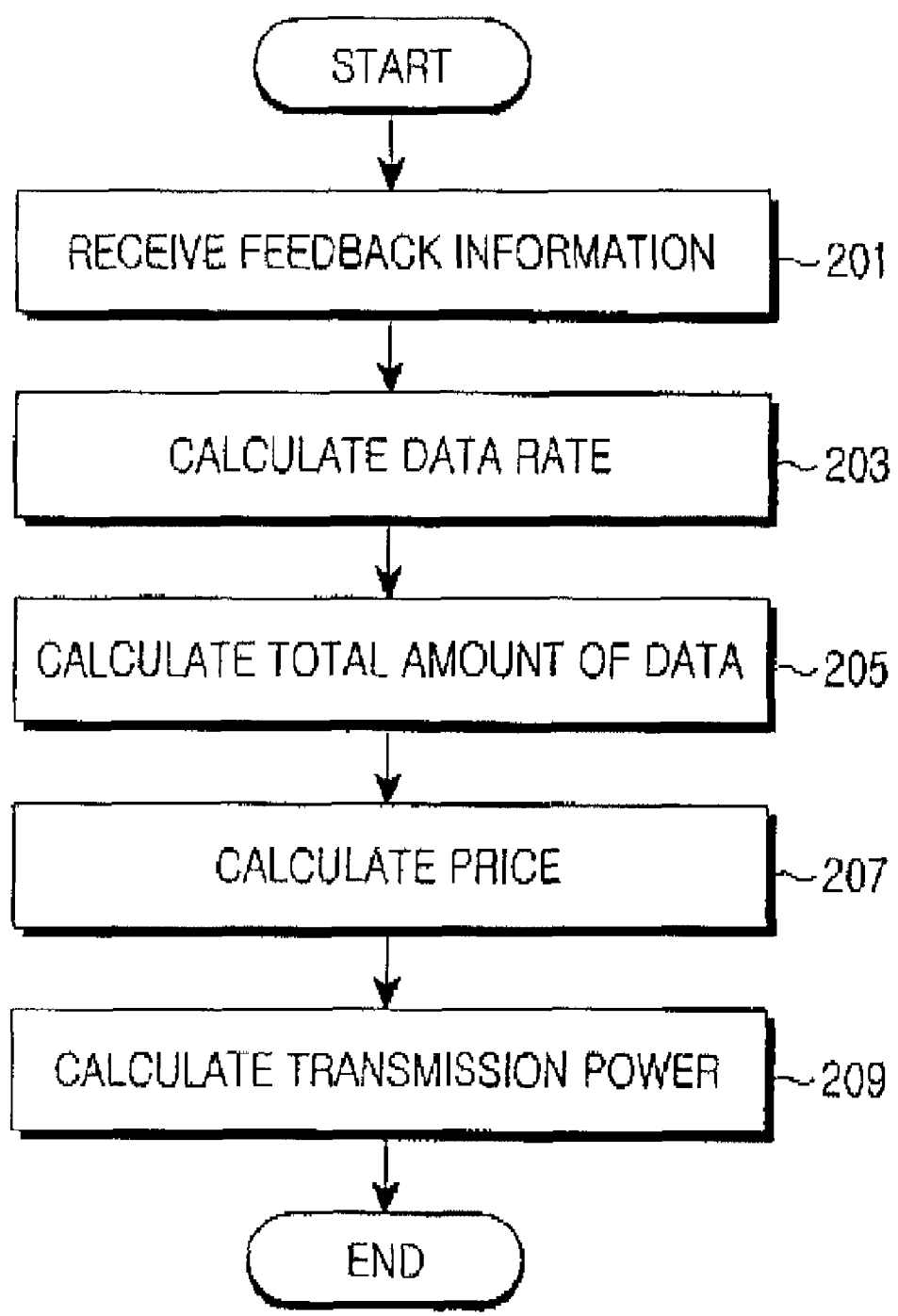
FIG. 2 is a flowchart illustrating an operation of controlling transmission power by a transmitter in a communication system according to the present invention.

FIG. 2 is a flowchart illustrating an operation of controlling transmission power by a transmitter in a communication system according to an embodiment of the present invention.

Referring to FIG. 2, the transmitter, as described above, receives in step 201 feedback information, or SINR information, transmitted from receivers located in its own cell. Thereafter, in step 203, the transmitter calculates data rates of the receivers according to the received feedback information, i.e. SINR information. In step 205, the transmitter calculates a load of the cell depending on the calculated data rates and information on the data to be transmitted to each of the receivers, i.e. calculates the total amount of data to be transmitted to the receivers.

Then the transmitter compares in step 207 the calculated load of the cell with a first threshold and a second threshold, and then calculates a price according to the comparison result using Equation (3) and Equation (4). That is, when the load of the cell is high, i.e. when the load of the cell is greater than the first threshold, the transmitter decreases the price below that in the previous period using Equation (3) so as to decrease a value of transmission power calculated by the utility function shown in Equation (1). However, when the load of the cell is low, i.e. when the load of the cell is less than the second threshold, the transmitter increases the price above that in the previous period using Equation (4) so as to increase a value of transmission power calculated by the utility function shown in Equation (1). After calculating the price in this manner, the transmitter calculates in step 209 transmission power for maximizing the utility function shown in Equation (1), and then transmits data to the receivers using the calculated transmission power, thereby providing a communication service to the receivers.

As is apparent from the foregoing description, according to the present invention, the transmitter controls transmission power depending on feedback information received from the receivers and information on the data to be transmitted to the receivers, thereby improving data reception performance of the receivers and also preventing waste of power and resources. In addition, the transmitter minimizes interference between neighbor cells, thereby improving performance of the communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling power at a transmitter in a communication system, the method comprising: receiving feedback information from receivers located in the transmitter's own cell; determining data rates of the receivers according to the received feedback information, calculating a load of the cell by calculating an amount of data to be transmitted to the receivers; and calculating transmission power of the transmitter by comparing the load of the cell with a threshold, wherein the threshold is determined by $p(t+1)=p(t)P_{avg}(t)/P_0$, where $p(t)$ denotes a price in a previous period, and an initial price $p(0)$ is set by the user or the system according to the communication system and communication environment, and $P_{avg}(t)$ denotes average transmission power used for data transmission for the previous period, and $p(t+1)$ denotes a price after a predetermined period.

2. The method of claim 1, wherein the feedback information is one of a Signal to Interference and Noise Ratio (SINR), a Carrier to Interference and Noise Ratio (CINR) and a Bit Error Ratio (BER).

3. The method of claim 1, wherein the calculation of the load of the cell comprises:
summing up average queue sizes of the receivers for a predetermined period.

4. The method of claim 1, wherein the calculation of the load of the cell comprises:
periodically generating and loading tokens for the individual receivers, and then removing the loaded tokens when transmitting data to the receivers.

5. The method of claim 1, wherein the calculation of the load of the cell comprises:
determining the amount of data to be transmitted to the receivers according to Quality of Service (QoS) of the receivers.

6. The method of claim 1, wherein the calculation of transmission power for data transmission to the receivers comprises:
comparing the load of the cell with the threshold, and calculating transmission power weighting factors of subchannels allocated to the receivers according to the comparison result.

7. The method of claim 6, wherein the calculation of transmission power weighting factors of subchannels comprises:
calculating weighting factors for increasing transmission power for data transmission to the receivers, when the calculated total amount of data is greater than the threshold.

8. The method of claim 7, wherein the threshold is an upper threshold which is set according to a maximum data buffer size of the transmitter.

9. The method of claim 6, wherein the calculation of transmission power weighting factors of subchannels comprises:
calculating weighting factors for decreasing transmission power for data transmission to the receivers, when the calculated total amount of data is less than the threshold.

10. The method of claim 9, wherein the threshold is a lower threshold which is set according to a minimum data buffer size of the transmitter.

11. The method of claim 1, wherein the feedback information comprises: channel gain information of the receivers.

12. A system for controlling power in a communication system, the system comprising: a transmitter for receiving feedback information from receivers located in its own cell, determining data rates of the receivers according to the received feedback information, calculating a load of the cell by calculating an amount of data to be transmitted to the receivers, and calculating transmission power of the transmitter by comparing the load of the cell with a threshold, wherein the threshold is determined by $p(t+1)=p(t)P_{avg}(t)/P_0$, where $p(t)$ denotes a price in a previous period, and an initial price $p(0)$ is set by the user or the system according to the communication system and communication environment, and $P_{avg}(t)$ denotes average transmission power used for data transmission for the previous period, and $p(t+1)$ denotes a price after a predetermined period.

13. The system of claim 12, wherein the feedback information is one of a Signal to Interference and Noise Ratio (SINR), a Carrier to Interference and Noise Ratio (CINR) and a Bit Error Ratio (BER).

14. The system of claim 12, wherein the transmitter calculates the load of the cell by summing up average queue sizes of the receivers for a predetermined period.

15. The method of claim 12, wherein the transmitter calculates the load of the cell by periodically generating and loading tokens for the individual receivers, and then removing the loaded tokens when transmitting data to the receivers.

16. The system of claim 12, wherein the transmitter calculates the load of the cell by determining the amount of data to be transmitted to the receivers according to Quality of Service (QoS) of the receivers.

17. The system of claim 12, wherein the transmitter compares the calculated load of the cell with the threshold, and calculates transmission power weighting factors of subchannels allocated to the receivers according to the comparison result.

18. The system of claim 17, wherein the transmitter calculates weighting factors for increasing transmission power for data transmission to the receivers, when the calculated total amount of data is greater than the threshold.

19. The system of claim 18, wherein the threshold is an upper threshold which is set according to a maximum data buffer size of the transmitter.

20. The system of claim 17, wherein the transmitter calculates weighting factors for decreasing transmission power for data transmission to the receivers, when the calculated total amount of data is less than the threshold.

21. The system of claim 20, wherein the threshold is a lower threshold which is set according to a minimum data buffer size of the transmitter.

22. The system of claim 12, wherein the feedback information comprises channel gain information of the receivers.

* * * * *